US008950992B1

(12) United States Patent
Vayntraub

(10) Patent No.: US 8,950,992 B1
(45) Date of Patent: Feb. 10, 2015

(54) TOGGLE NAIL

(76) Inventor: Vladimir Vayntraub, Los Angeles, CA (US)

( * ) Notice: Subject to any disclaimer, the term of this patent is extended or adjusted under 35 U.S.C. 154(b) by 282 days.

(21) Appl. No.: 13/568,058

(22) Filed: Aug. 6, 2012

(51) Int. Cl.
*F16B 13/04* (2006.01)
*F16B 13/10* (2006.01)

(52) U.S. Cl.
CPC ............ *F16B 13/04* (2013.01); *F16B 2013/10* (2013.01)
USPC .......................................... 411/344; 411/450

(58) Field of Classification Search
CPC ...... F16B 13/0808; F16B 21/12; F16B 21/10; F16B 21/086; F16B 45/00; F16B 37/04; F16B 13/002; F16B 2013/10; F16B 13/04; B60D 1/02; B60D 1/025; B25B 31/005; B60R 13/105; B28B 7/0014; B28B 7/0064
USPC .................. 411/340–346, 337, 439, 446, 450
See application file for complete search history.

(56) References Cited

U.S. PATENT DOCUMENTS

| | | | | | |
|---|---|---|---|---|---|
| 2,203,146 | A | * | 6/1940 | Hexdall | 411/344 |
| 2,908,196 | A | * | 10/1959 | Apfelzweig | 411/344 |
| 3,127,807 | A | * | 4/1964 | Modrey | 411/340 |
| 3,285,118 | A | * | 11/1966 | Elkins | 411/346 |
| 3,927,597 | A | | 12/1975 | Stults et al. | |
| 4,043,245 | A | * | 8/1977 | Kaplan | 411/346 |
| 4,196,883 | A | | 4/1980 | Einhorn et al. | |
| 4,283,986 | A | | 8/1981 | Peterson et al. | |
| 4,354,782 | A | | 10/1982 | Newport | |
| 4,500,238 | A | * | 2/1985 | Vassiliou | 411/30 |
| 4,502,826 | A | * | 3/1985 | Fafard | 411/340 |
| 4,627,777 | A | | 12/1986 | Johansson | |
| 4,902,179 | A | | 2/1990 | Harker | |
| 4,941,340 | A | | 7/1990 | Nowak et al. | |
| 5,037,257 | A | | 8/1991 | Kubic et al. | |
| 5,139,377 | A | * | 8/1992 | Reed | 411/340 |
| 5,215,418 | A | * | 6/1993 | Trainer et al. | 411/345 |
| 5,221,169 | A | * | 6/1993 | McSherry et al. | 411/344 |
| 5,236,293 | A | * | 8/1993 | McSherry et al. | 411/344 |
| 5,322,401 | A | * | 6/1994 | Vernet et al. | 411/344 |
| 5,443,343 | A | | 8/1995 | Mutz et al. | |
| 5,447,005 | A | * | 9/1995 | Giannuzzi | 411/29 |
| 5,535,570 | A | * | 7/1996 | Lynn | 411/340 |
| 5,876,169 | A | * | 3/1999 | Wrigley | 411/344 |
| 5,893,693 | A | * | 4/1999 | Forest et al. | 411/30 |
| 6,250,865 | B1 | * | 6/2001 | McSherry | 411/344 |
| 6,435,789 | B2 | * | 8/2002 | Gaudron | 411/344 |
| 6,866,458 | B2 | | 3/2005 | Farrell et al. | |
| 7,118,315 | B2 | | 10/2006 | Huang | |
| 7,547,171 | B2 | * | 6/2009 | McDuff | 411/400 |
| 7,611,316 | B2 | * | 11/2009 | Panasik et al. | 411/346 |
| 7,752,732 | B2 | | 7/2010 | Brown et al. | |
| 8,449,236 | B2 | * | 5/2013 | McDuff et al. | 411/344 |

(Continued)

*Primary Examiner* — Gay Ann Spahn
(74) *Attorney, Agent, or Firm* — QuickPatents; Kevin Prince

(57) ABSTRACT

An anchor for attaching a screw to a wall includes a flat body with a pointed front end, a track aperture formed through a center portion, and a flat back end with a screw guide arm. A flat pivot plate has a front end, a back end with an angled portion, a central drive aperture, and a pair of lateral notches formed at two opposing sides thereof. The pivot plate traverses the track aperture of the body at the notches. In use, the pointed front end of the body is driven through the wall and the screw is inserted adjacent the guide arm to contact the angled portion of the pivot plate to cause same to pivot about the notches until the screw traverses the drive aperture, pulling the pivot plate along the track aperture towards the wall to compress the wall between the screw and the pivot plate.

14 Claims, 5 Drawing Sheets

(56) References Cited

U.S. PATENT DOCUMENTS

| | | | |
|---|---|---|---|
| 2006/0088399 A1* | 4/2006 | DeMeo | 411/340 |
| 2008/0253860 A1* | 10/2008 | McDuff et al. | 411/344 |
| 2009/0003962 A1* | 1/2009 | McDuff et al. | 411/344 |
| 2009/0169331 A1* | 7/2009 | Pilon | 411/345 |
| 2009/0249738 A1* | 10/2009 | Brereton et al. | 411/344 |
| 2011/0164941 A1* | 7/2011 | Snead | 411/340 |
| 2012/0045292 A1* | 2/2012 | Kaye | 411/15 |
| 2013/0243546 A1* | 9/2013 | McDuff et al. | 411/341 |
| 2013/0343831 A1* | 12/2013 | McDuff et al. | 411/340 |
| 2014/0017031 A1* | 1/2014 | Prichard et al. | 411/204 |
| 2014/0199132 A1* | 7/2014 | McDuff | 411/340 |

\* cited by examiner

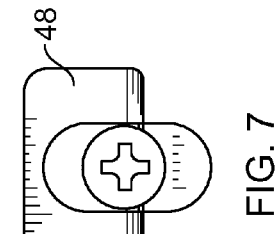
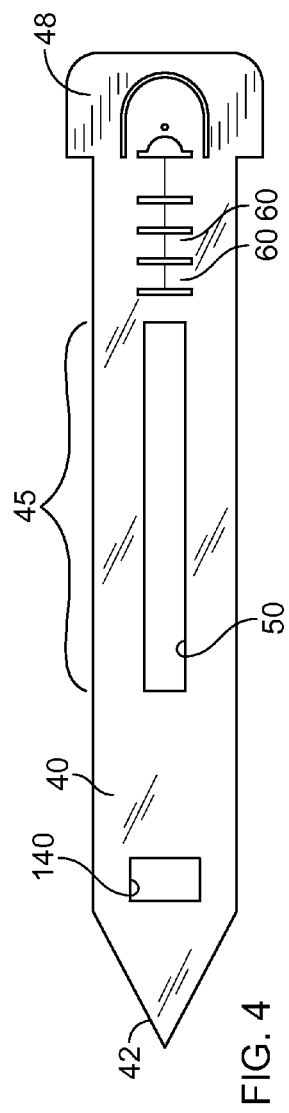
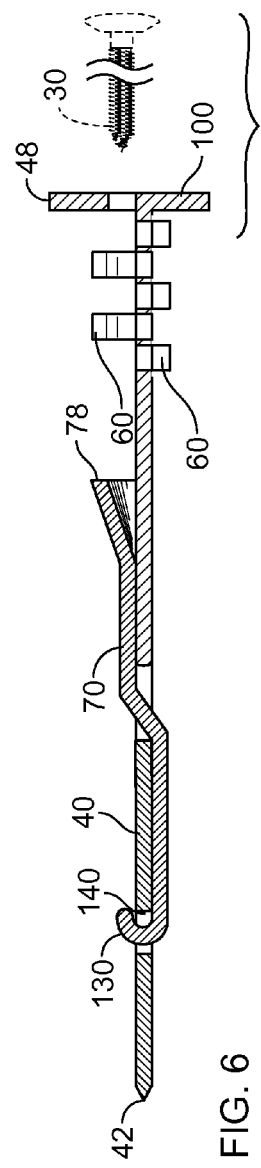
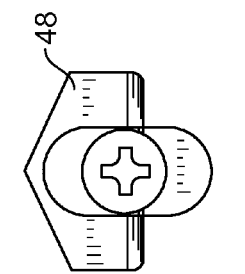
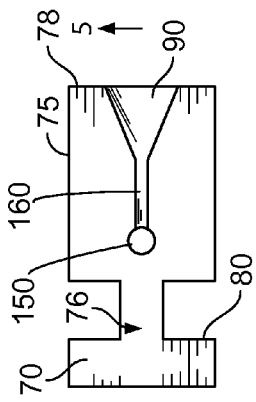
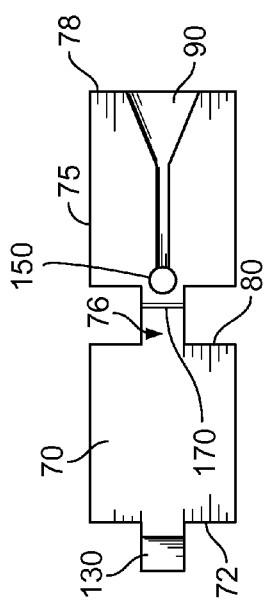

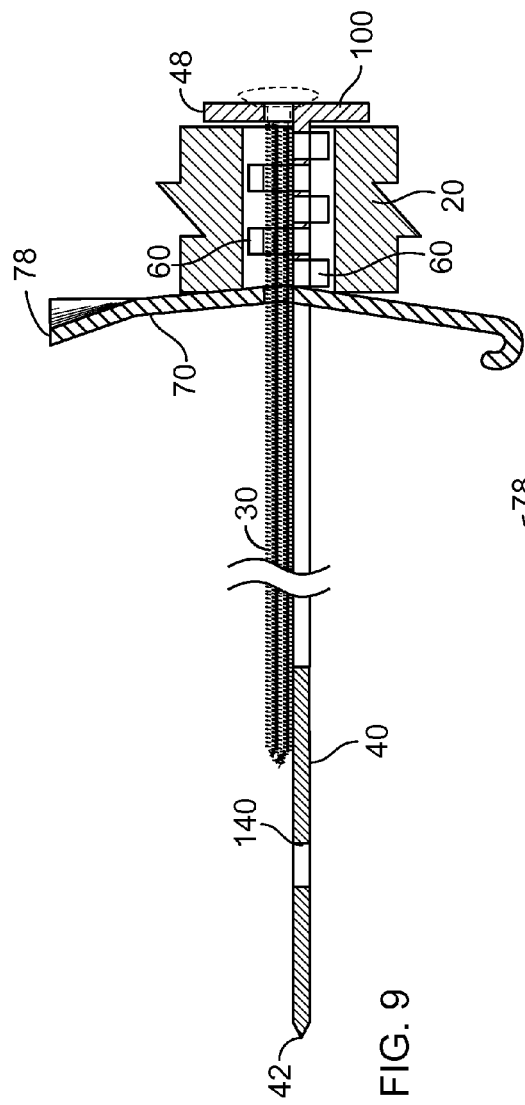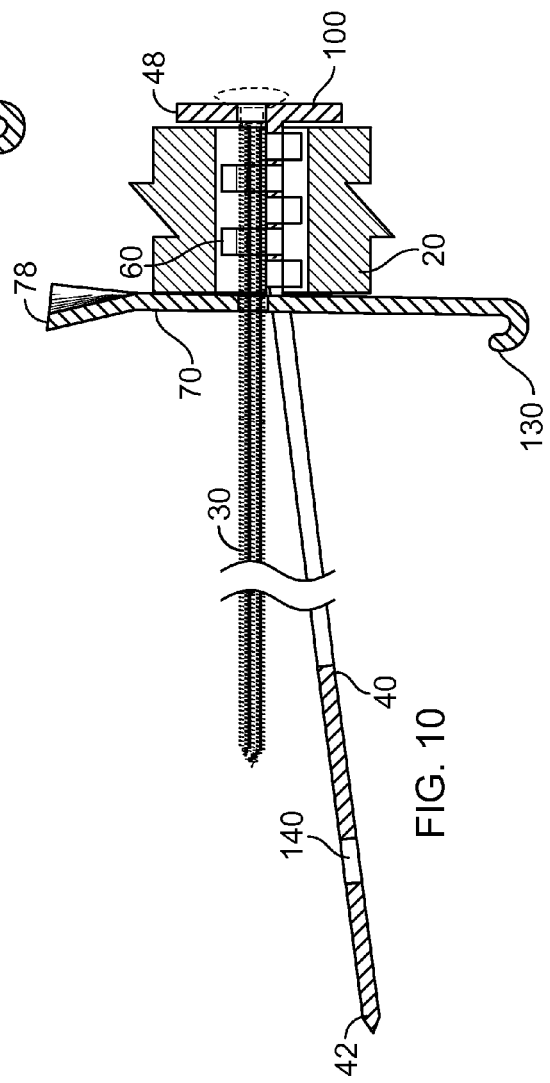

TOGGLE NAIL

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to wall fasteners, and more particularly to a drywall-piercing wall fastener.

DISCUSSION OF RELATED ART

Fasteners and anchors for holding screws or hooks to a vertical surface, such as a wall, have improved over time. Such fasteners allow picture frames and other items to be mounted securely to a wall. However, prior art fasteners have primarily three drawbacks. First, many wall fasteners result in the weight of a supported load to be transferred to the wall board at a single point or relatively small surface. As such, drywall material at such a point can become weak, crumble, and fail, ultimately leading to failure of the fastener in supporting the load. Second, the size of the hole created by the fastener in the wall is often considerable with prior art anchors, and when such a fastener is removed the wall must be extensively repaired. Third, such prior art fasteners are often difficult to install.

U.S. Pat. No. 3,927,597 addresses some of these issues in that the embodiment made of a flat sheet metal material spreads the weight of the load over a surface area, not a single point as is common with other prior art fasteners. Further, as the fastener is relatively flat, the resulting hole in the support member or wall is relatively small and easy to repair. However, such a device is difficult to install initially since the pointed tip of the pivoting clamp is just loosely connected with the shank (106) that is driven into the wall with a hammer, for example. This can result in the pivoting clamp (122) pivoting prematurely due to slipping off of the flanges 128 due to impact from the hammer.

Therefore, there is a need for a fastener device for fastening a screw or hook through a wall that results in relatively little damage to the wall upon removal, that spreads the weight of the load over a relatively large surface of the wall, and that is easily installed. Such a needed invention would be relatively easy to manufacture by stamping from a unitary sheet of metal, for example. The present invention accomplishes these objectives.

SUMMARY OF THE INVENTION

The present device is an anchor for attaching a screw to a support wall. A rigid substantially flat body has a pointed front end and a flat back end. The body includes at least one track aperture formed through a center portion thereof. At least one screw guide arm projects away from the body between the back end thereof and the at least one track aperture.

A rigid substantially flat pivot plate has a front end, a back end, and a pair of lateral notches formed at two opposing sides thereof. The pivot plate is adapted to traverse the at least one track apertures of the body, engaging the body at the notches thereof. The back end of the pivot plate has an angled portion.

In use, with the pivot plate engaged with the body, the pointed front end of the body may be positioned at a desired puncture point on the support wall and driven through the support wall by pounding on the flat back end of the body. As such, once the body and the pivot plate have traversed the support wall, the screw may be inserted between the at least one screw guide arm to contact the angled portion of the pivot plate. This causes the pivot plate to pivot about the notches until the screw traverses the drive aperture of the pivot plate. Continual turning of the screw threads the drive aperture and pulls the pivot plate along the at least one track aperture towards the support wall to eventually compress the support wall between the screw and the pivot plate. As such, the anchor and screw are fastened to the support wall.

The present invention is a fastener device for fastening a screw or hook through a wall that results in relatively little damage to the wall upon removal, that spreads the weight of the load over a relatively large surface of the wall, and that is easily installed with a hammer. The present invention is relatively easy to manufacture by stamping from a unitary sheet of metal, for example. Other features and advantages of the present invention will become apparent from the following more detailed description, taken in conjunction with the accompanying drawings, which illustrate, by way of example, the principles of the invention.

DESCRIPTION OF THE DRAWINGS

FIG. 4 is a top plan view of the body of the invention;

FIG. 5 is a top plan view of the pivot plate of the invention;

FIG. 6 is a cross-sectional view of the invention, taken generally along line 6-6 of FIG. 1;

FIG. 7 is a rear elevational view of the invention;

FIG. 8 is a is top plan view of an alternate embodiment of the pivot plate of the invention;

FIG. 9 is a cross-sectional view of the invention, configured as in FIG. 3 and taken generally alone lines 6-6 of FIGS. 4 and 5;

FIG. 10 is a cross-sectional view of an alternate embodiment of the invention, configured as in FIG. 3 and taken generally alone lines 6-6 of FIGS. 4 and 5; and FIG. 11 is an alternate embodiment of a back end of the body.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
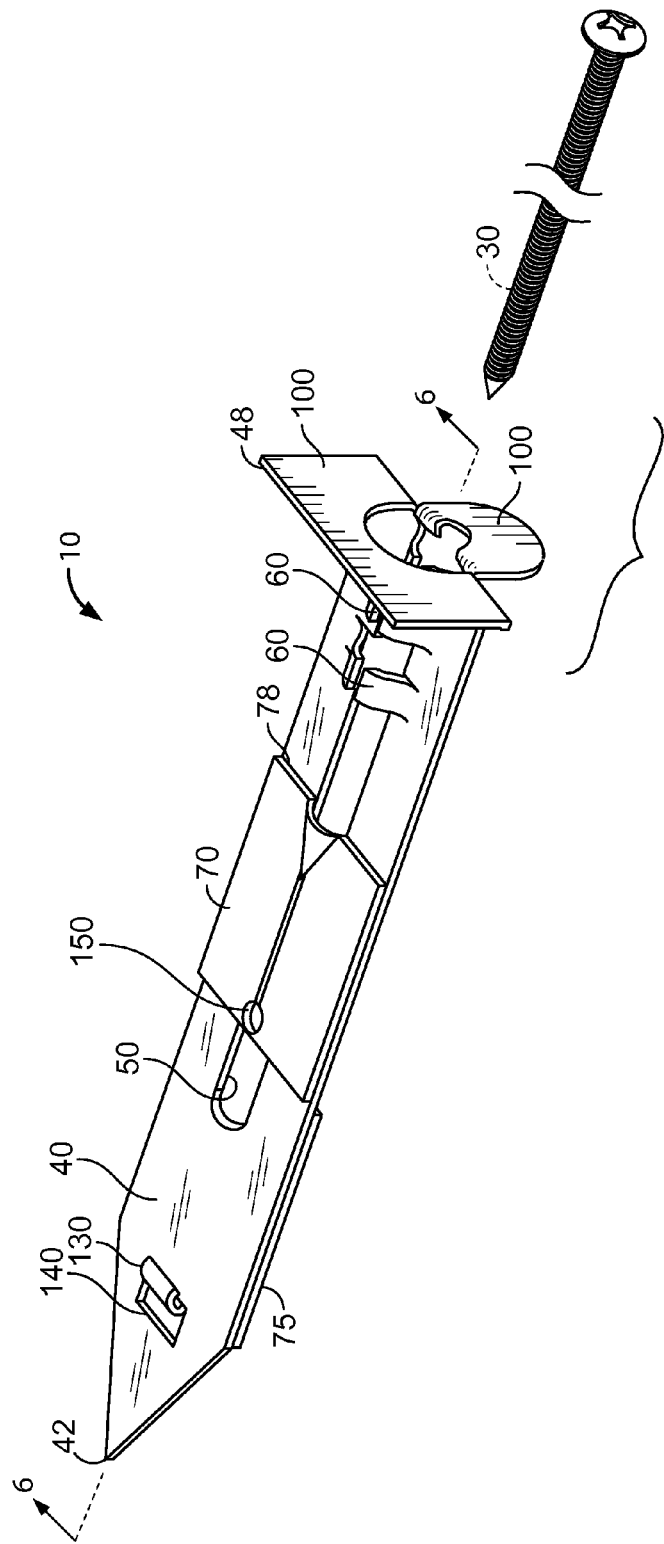
FIG. 1 is a perspective view of the invention, illustrated with a pivot plate of the invention in a flat configuration against a body of the invention.
Figure 2:
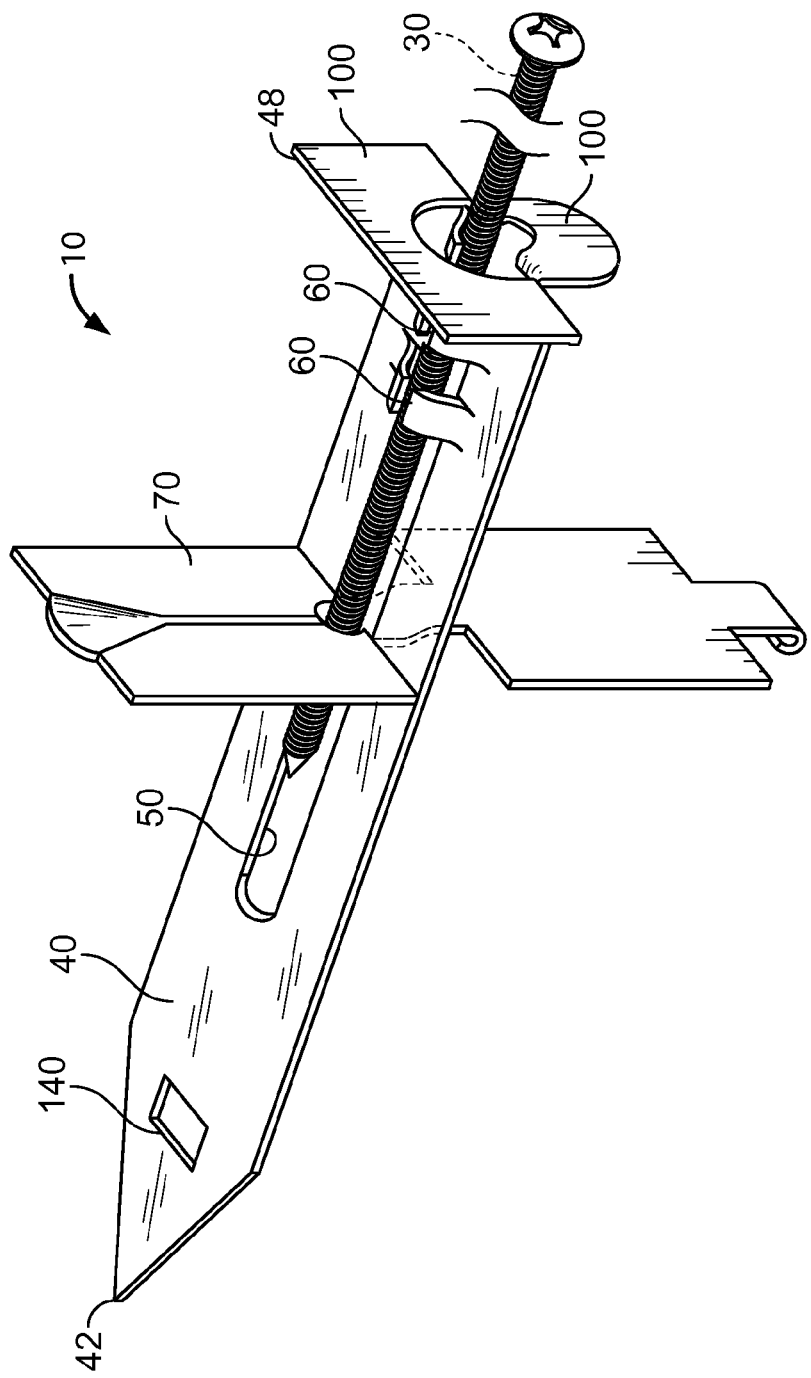
FIG. 2 is a perspective view thereof, illustrated with the pivot plate of the invention in a generally orthogonal configuration with respect to the body of the invention as a screw begins to pull the pivot plate towards a wall.
Figure 3:
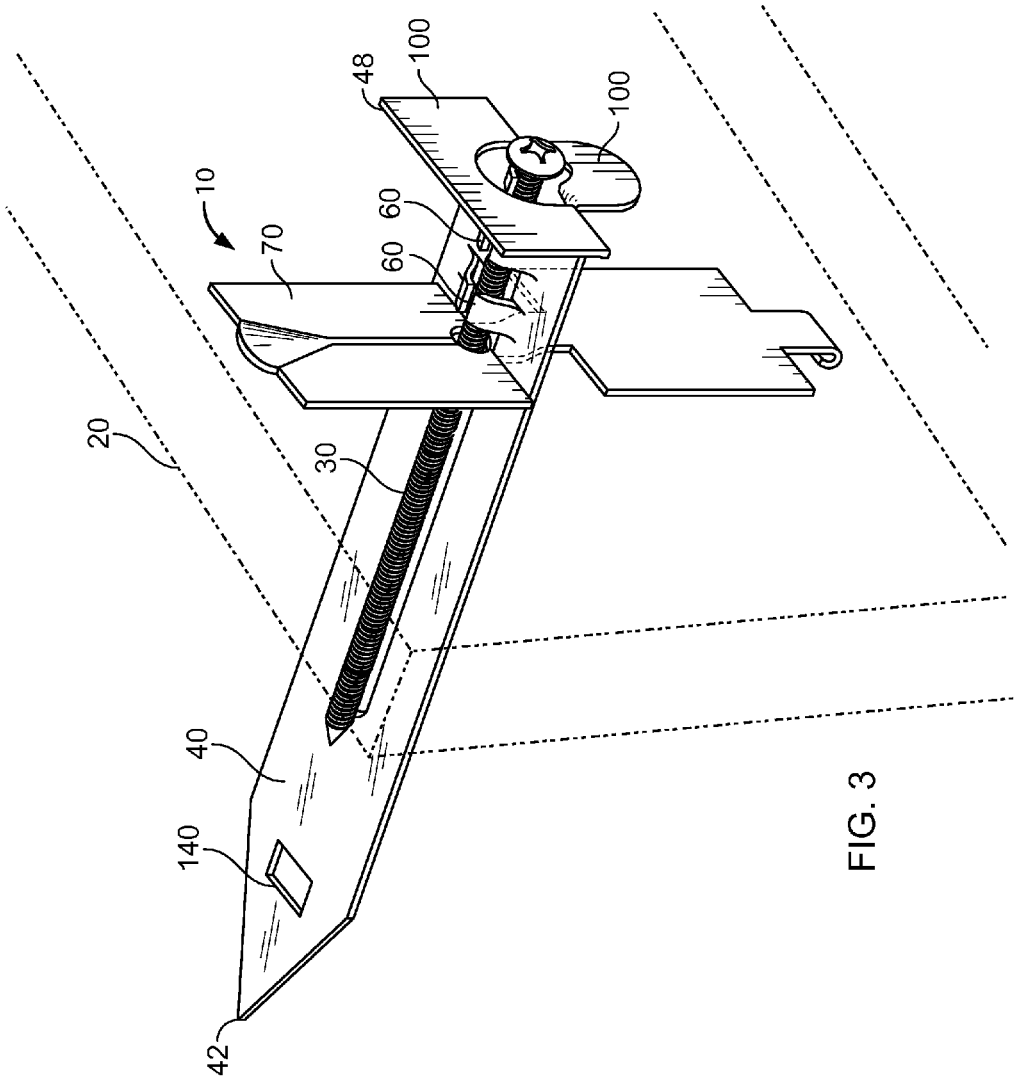
FIG. 3 is a perspective view thereof, illustrated with the pivot plate of the invention in a generally orthogonal configuration with respect to the body of the invention and in a fully retracted position, as pressing up against the wall.

FIGS. 1-3 illustrate an anchor 10 for attaching a screw 30 to a support wall 20. Such a support wall 20 is preferably drywall of between ½ and ¾ inches. The screw 30 may be included with the anchor 10 or provided separately.

A rigid substantially flat body 40 (FIG. 4) has a pointed front end 42 and a flat back end 48. The body 40 includes at least one track aperture 50 formed through a center portion 45 thereof. At least one screw guide arm 60 projects away from the body 40 between the back end 48 thereof and the at least one track aperture 50. Preferably the at least one screw guide arm 60 is exactly two screw guide arms 60 positioned one in front of the other between the flat back end 48 and the at least one track aperture 50 of the flat body 40.

A rigid substantially flat pivot plate 70 (FIG. 5) has a front end 72, a back end 78, and a pair of lateral notches 80 formed at two opposing sides 75 thereof. The pivot plate 70 is adapted to traverse the at least one track apertures 50 of the body 40, engaging the body 40 at the notches 80 thereof. The back end 78 of the pivot plate 70 has an angled portion 90. The pivot plate 70 has a drive aperture 150 at a center point 76 thereof and formed therethrough.

In one embodiment, the drive aperture 150 of the pivot plate 70 is offset from a pivot line between the notches, whereby as the pivot plate 70 is pulled towards the support wall 20 the pivot plate 70 presses the flat body 40 away from the screw 30 to increase tension between the anchor 10 and the support wall 20.

Preferably the body 40 and pivot plate 70 are each formed by stamping from a sheet metal material, such as 16 gauge steel sheet material for example. Alternately, the body 40 and pivot plate 70 may each be formed by an injection molded process with rigid, relatively strong plastic material, such as an epoxy resin or the like.

In use, with the pivot plate 70 engaged with the body 40 (FIGS. 1 and 6), the pointed front end 42 of the body 40 may be positioned at a desired puncture point on the support wall 20 and driven through the support wall 20 by pounding on the flat back end 48 (FIG. 7) of the body 40. As such, once the body 40 and the pivot plate 70 have traversed the support wall 20, the screw 30 may be inserted between the at least one screw guide arm 60 to contact the angled portion 90 of the pivot plate 70. This causes the pivot plate 70 to pivot about the notches 80 until the screw 30 traverses the drive aperture 150 of the pivot plate 70 (FIGS. 5 and 8). In one embodiment, a channel 160 (FIG. 5) may be formed in the pivot plate 70 between the angled portion 90 and the drive aperture 150 to further guide the tip of the screw 30 towards the drive aperture 150 and add rigidity to the pivot plate 70. Continual turning of the screw 30 threads the drive aperture 150 and both pivots the pivot plate 70 and pulls the pivot plate 70 along the at least one track aperture 50 towards the support wall 20 to eventually compress the support wall 20 between the pivot plate 70 and either the screw 30 or the back end 48 of the body 40. As such, the anchor 10 and screw 30 are fastened to the support wall 20.

In one embodiment, the back end 48 of the body 40 includes at least one back flange 100 bent at a substantially right angle with respect to the flat body 40. As such, fastening of the anchor 10 and screw 30 to the support wall 20 is accomplished by compressing the support wall 20 between the at least one back flange 100 and the pivot plate 70. In one embodiment, illustrated in FIG. 11, the back flange 100 may be pointed to indicate an upward direction for the anchor 10.

In one embodiment, the front end 72 of the pivot plate 70 includes a forward tab 130 (FIGS. 1 and 6) adapted to traverse a tab aperture 140 formed proximate the front end 42 of the flat body 40. As such, the pivot plate 70 is prevented from pivoting while traversing the support wall 20.

In one embodiment (not shown), the pivot plate 70 is made from a thinner material than the body 40, such as 18 gauge steel plate, since the pivot plate 70 does not transmit impact energy as does the body 40, and therefore does not need to be as strong or rigid. In yet another embodiment, illustrated in FIG. 8, the pivot plate 70 may be truncated as with respect to that shown in FIG. 5 to reduce the weight and cost of the anchor 10. Further, the drive aperture 150 may be longitudinally shifted along the pivot plate 70 so that as the screw 30 is tightened, the pivot plate 70 forces the body 40 to bend away from the screw 30 (FIG. 10) to further tighten the anchor 10 within the support wall 20. Further, a score line 170 (FIG. 5) may be formed in the pivot plate 70 to allow the pivot plate to bend upon tightening (FIG. 9) of the screw 30.

While a particular form of the invention has been illustrated and described, it will be apparent that various modifications can be made without departing from the spirit and scope of the invention. For example, various shapes and configurations of the pivot plate and body may be utilized. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. An anchor for attaching a screw to a support wall, comprising:
    a rigid substantially flat body having a pointed front end and a flat back end, the body including at least one track aperture formed through a center portion thereof, at least one screw guide arm projecting away from the body between the back end thereof and the at least one track aperture;
    a rigid substantially flat pivot plate having a rounded, non-pointed front end, a back end, and a pair of lateral notches formed at two opposing sides thereof, the pivot plate adapted to traverse the at least one track aperture of the body, engaging the body at the notches thereof, the back end of the pivot plate having an angled portion, the pivot plate having a drive aperture at a center point thereof formed therethrough;
    whereby with the pivot plate engaged with the body, the pointed front end of the body may be positioned at a desired puncture point on the support wall and driven through the support wall by pounding on the flat back end of the body, the front end of the pivot plate following the pointed front end of the flat body through the support wall, such that once the body and pivot plate have traversed the support wall the screw may be inserted between the at least one screw guide arm to contact the angled portion of the pivot plate, thereby causing the pivot plate to pivot about the notches until the screw traverses the drive aperture of the pivot plate, continual turning of the screw threading the drive aperture and pulling the pivot plate along the at least one track aperture towards the support wall to eventually compress the support wall between the screw and the pivot plate, thereby fastening the anchor and screw to the support wall.

2. The anchor of claim 1 wherein the back end of the flat body includes at least one back flange bent at a substantially right angle with respect to the flat body, whereby fastening of the anchor and screw to the support wall is accomplished by compressing the support wall between the at least one back flange and the pivot plate.

3. The anchor of claim 1 wherein the flat body includes exactly one track aperture.

4. The anchor of claim 1 wherein the front end of the pivot plate includes a forward tab adapted to traverse a tab aperture formed proximate the front end of the flat body to prevent the pivot plate from pivoting while traversing the support wall.

5. The anchor of claim 1 wherein the flat body and the pivot plate are each formed by stamping from a sheet metal material.

6. The anchor of claim 1 wherein the at least one screw guide arm is exactly two screw guide arms positioned one in front of the other between the flat back end and the at least one track aperture of the flat body.

7. The anchor of claim 1 wherein the drive aperture of the pivot plate is offset from a pivot line between the notches, whereby as the pivot plate is pulled towards the support wall the pivot plate presses the flat body away from the screw to increase tension between the anchor and the support wall.

8. An anchor for attaching a screw to a support wall, comprising:
    a rigid substantially flat body having a pointed front end and a flat back end, the body including at least one track aperture formed through a center portion thereof, at least one screw guide arm projecting away from the body between the back end thereof and the at least one track aperture;
    a rigid substantially flat pivot plate having a front end, a back end, and a pair of lateral notches formed at two opposing sides thereof, the pivot plate adapted to traverse the at least one track aperture of the body, engaging the body at the notches thereof, the back end of the pivot plate having an angled portion, the pivot plate having a drive aperture at a center point thereof formed therethrough, the front end of the pivot plate constrained to terminate behind the pointed front end of the flat body, between the pointed front end of the flat body and the flat back end of the body;
    whereby with the pivot plate engaged with the body, the pointed front end of the body may be positioned at a desired puncture point on the support wall and driven through the support wall by pounding on the flat back end of the body, the front end of the pivot plate following the pointed front end of the flat body through the support wall, such that once the body and pivot plate have traversed the support wall the screw may be inserted between the at least one screw guide arm to contact the angled portion of the pivot plate, thereby causing the pivot plate to pivot about the notches until the screw traverses the drive aperture of the pivot plate, continual turning of the screw threading the drive aperture and pulling the pivot plate along the at least one track aperture towards the support wall to eventually compress the support wall between the screw and the pivot plate, thereby fastening the anchor and screw to the support wall.

9. The anchor of claim 8 wherein the back end of the flat body includes at least one back flange bent at a substantially right angle with respect to the flat body, whereby fastening of the anchor and screw to the support wall is accomplished by compressing the support wall between the at least one back flange and the pivot plate.

10. The anchor of claim 8 wherein the flat body includes exactly one track aperture.

11. The anchor of claim 8 wherein the front end of the pivot plate includes a forward tab adapted to traverse a tab aperture formed proximate the front end of the flat body to prevent the pivot plate from pivoting while traversing the support wall.

12. The anchor of claim 8 wherein the flat body and the pivot plate are each formed by stamping from a sheet metal material.

13. The anchor of claim 8 wherein the at least one screw guide arm is exactly two screw guide arms positioned one in front of the other between the flat back end and the at least one track aperture of the flat body.

14. The anchor of claim 8 wherein the drive aperture of the pivot plate is offset from a pivot line between the notches, whereby as the pivot plate is pulled towards the support wall the pivot plate presses the flat body away from the screw to increase tension between the anchor and the support wall.

* * * * *